(12) United States Patent
Doyle (10) Patent No.: US 6,478,389 B2
(45) Date of Patent: Nov. 12, 2002

(54) LOW GROUND PRESSURE TIRE CHAINS FOR SKID-STEER LOADERS AND OTHER CONSTRUCTION MACHINERY

(76) Inventor: Richardson J. Doyle, 7633 Somerset Blvd., Paramount, CA (US) 90723

( * ) Notice: Subject to any disclaimer, the term of this patent is extended or adjusted under 35 U.S.C. 154(b) by 0 days.

(21) Appl. No.: 10/005,116

(22) Filed: Dec. 4, 2001

(65) Prior Publication Data

US 2002/0079738 A1 Jun. 27, 2002

Related U.S. Application Data

(63) Continuation-in-part of application No. 09/747,319, filed on Dec. 22, 2000.

(51) Int. Cl.$^7$ .......................... A01B 33/00; B60B 15/00; B62D 55/07; B60S 1/62; B60C 11/00
(52) U.S. Cl. ......................... 305/187; 305/19; 305/111; 152/225 R
(58) Field of Search .................... 152/225 R, 226, 152/227, 228; 305/7, 19, 187, 188, 189, 191, 111, 200, 201, 160, 161, 162

(56) References Cited

U.S. PATENT DOCUMENTS

| | | | |
|---|---|---|---|
| 1,077,129 A | * | 10/1913 | Douglas ................. 305/111 |
| 1,633,259 A | * | 6/1927 | Langenfield ............ 305/188 |
| 1,924,161 A | | 8/1933 | Knox |
| 2,455,307 A | | 11/1948 | Irvin |
| 2,755,146 A | | 7/1956 | Galanot |
| 2,973,995 A | | 3/1961 | Weier |
| 3,133,767 A | * | 5/1964 | Wunsch ................. 305/111 |
| 3,355,224 A | | 11/1967 | Skanes et al. |
| 3,497,271 A | | 2/1970 | Keller |
| 4,089,565 A | | 5/1978 | Logering et al. |
| 4,099,794 A | | 7/1978 | Hoffart |
| 4,605,264 A | * | 8/1986 | Tonsor .................. 305/188 |
| 4,765,694 A | | 8/1988 | Cory |
| 5,255,964 A | | 10/1993 | Hara |
| 5,261,733 A | | 11/1993 | Hara |
| 5,284,387 A | | 2/1994 | Logering |
| 5,429,429 A | | 7/1995 | Logering et al. |
| 5,951,124 A | | 9/1999 | Hoffart |
| 5,988,776 A | | 11/1999 | Zurn |
| 6,010,199 A | | 1/2000 | Hoffart |
| 6,203,127 B1 | | 3/2001 | Chapman |
| 6,299,265 B1 | | 10/2001 | Hoffart |

* cited by examiner

Primary Examiner—S. Joseph Morano
Assistant Examiner—Jason H. Bellinger
(74) Attorney, Agent, or Firm—Trojan Law Offices (57) ABSTRACT

Low ground pressure tire chains for skid-steer loaders and other construction machinery. A track (12) for parallel drive wheeled vehicles (10) having spaced apart pairs of wheels (14,16) assembled with a plurality of base units (24) pivotally interconnected in series by opposing links (26), each base unit comprising a pair of opposing side supports (32) with a wedge portion (36) extending towards the opposing side support to wedgingly receive a portion of a tire in a gap between the opposing side support's. A pair of spaced-apart transverse cross members (34) extending between the side supports and define cavities (50) between a leading edge and the wedge portion for receiving fasteners to secure a bottom plate (52) to the base unit. The assembled track mounts around the tires of the loader to provide traction and floatation of the loader during operation in mud or sand.

16 Claims, 8 Drawing Sheets

LOW GROUND PRESSURE TIRE CHAINS FOR SKID-STEER LOADERS AND OTHER CONSTRUCTION MACHINERY

RELATED PATENT APPLICATION

This application is a continuation-in-part of U.S. patent application Ser. No. 09/747,319 filed Dec. 22, 2000.

TECHNICAL FIELD

This invention relates to tire chains. More particularly, the present invention relates to tire chains used on compact front-end loaders and other similar construction machinery to improve floatation, traction, and handling during operation.

BACKGROUND OF THE INVENTION

For many years cars, trucks, and other tire mounted vehicles have used tire chains to improve operational control over soft or slippery road surfaces.

A. Skid Steer Loaders

More recently, construction machinery owners have attempted to use tire chains on tire mounted construction machines. This is especially true for compact front-end loaders, which will be referred to as skid steers. Skid steers are powerful compact loaders used to dig, haul, or lift earth and other materials. The main components of skid steer loaders include an operator's cab, a diesel or gasoline engine, hydraulic pumps, hydrostatic transmission, a pair of lift arms, a bucket operatively attached at the 25 distal ends of the lift arms, and two pairs of opposing tires. Many other construction machines and vehicles are composed of similar components. What separates the skid steer from its counterpart construction machinery is its unique steering system.

B. Steering Systems

Front-wheel steering is a popular directional steering system used on tire-mounted vehicles such as cars and trucks. A car usually steers or turns by changing the direction of the front tires. Turning occurs because while being in motion the centerline of the front tires is no longer parallel or in line with the centerline of the rear tires. Similar concepts, e.g. rear-wheel and all-wheel steering, can be seen in typical forklifts.

Many tire-mounted construction machines use articulated directional steering. Articulated steering works because the vehicles are designed in two separate independent sections. The two sections are connected at a pivotal point. Whenever the two sections pivot and their centerlines point in different (unparallel) directions, the vehicle turns. Articulated steering can be seen in most front-end loaders over 10,000 pounds.

C. Steering System for Skid Steer Loaders

The skid steer loaders use a directional steering system. In skid steers, the centerlines of the front and rear tires remain parallel and in line with each other at all times. This kind of steering system can be also seen in excavators, bulldozers and tanks, and is one of the very few steering systems that allow the vehicle to turn 360 degrees without moving forward or backward.

The directional steering capabilities of a skid steer arises from the independent pairs of left and right side drive systems. Tire-mounted skid steers have four axles, two per side of the machine. The two axles per side are spaced typically 3 feet to 4 feet apart on the same lateral axis and evenly protruding from the machine body. Identical wheels and tires are mounted on each of the axles. A key factor for the turning capabilities of skid steer loaders is that the left and right pairs of opposing tires are powered by independent drive systems. As a result, when the left and right pairs of opposing tires are moving forward at the same speed, then the machine moves straight forward. However, if the left pair of tires is moving forward at a different speed than the right pair of tires, then the loader will slide and turn. The machine turns in the direction of the side with the faster moving pair of tires. Moreover, if the left pair of tires is moving forward and the right pair of tires is moving backward, or vice versa, at the same speed, then the skid steer performs a 360-degree rotation without moving forward or backward. Since all four Skid steer tires remain parallel and in line to each other at all times, tire chains can be utilized more efficiently to improve floatation, traction and control.

D. Applying Tire Chains to Skid Steers In the last decade, the skid steer has become a very popular machine in the construction industry. It has won recognition for being a versatile machine (for example, being the construction vehicle with a great variety of attachments), and a compact and maneuverable machine that can handle many types of construction jobs. However, occasionally the tires of the skid steer tend to slip, especially in snow, mud, sand, and other slippery or boggy conditions that are often found on job sites. The insufficient traction of the four skid steer tires under certain conditions results in unsatisfactory and often risky operation and performance. In an attempt to resolve this, tire chains have been applied to skid steers.

When cars or trucks use tire chains, each tire must use its own chain, the so-called "single-wheel" tire chain. Due to the unique steering system of the skid steer—all wheels remaining parallel and in line with each other at all times—a more advanced tire chain can be used. The skid steer "two-wheel" tire chain is wrapped around each pair of left and right side tires. The two-wheel tire chain is more efficient because more chain is making contact with the operating ground. The whole area between the two tires on each side of the machine (usually 3 to 4 feet) is used for additional traction and floatation. This feature of the skid steer two-wheel tire chain is in sharp contrast to the single-wheel tire chains, which utilize only the operating ground that is immediately under the tire. Depending on the spread of the wheelbases of the skid steer, the contact area between the operating ground and the two-wheel tire chain can be on average 5 to 10 times greater than that of the single-wheel tire chain.

E. Current Tire Chains for Skid Steer

Current tire chains made for skid steers attempt to solve the problem with traction insufficiency under slippery or boggy operating ground conditions. The main component of the current skid steer two-wheel tire chains is the "pad." The pad usually consists of a crossbar with two opposing sidewalls —one on each side of the crossbar. The sidewalls, which are set perpendicular to the connecting crossbar, create a valley or groove. When subsequent pads are connected together with links to comprise a chain, a continuous groove is formed for skid steer tires to ride within. The sidewalls of each pad keep the chain aligned with the tires and at the same time prevent the tires from derailing off the chain.

F. Drawbacks of Current Two-Wheel Tire Chains for Skid Steers

Current two-wheel tire chains for skid steers generally work mechanically well. However, these tire chains provide poor enhancement to the traction of the loader machine in slippery or boggy conditions and offer little or no floatation. The term "floatation" refers to the wheels and chains of the loader remaining above the ground surface, rather than sinking into the ground during operation of the skid steer. For the optimal performance of the skid steer, both problems of traction and floatation have to be resolved simultaneously. In addition to the traction and floatation problems, the current two-wheel tire chains for skid steers impose many other inconvenient restrictions that need consideration.

One drawback is that current skid steer two-wheel tire chains have a large open space between adjacent pads and between the two crossbars of each individual pad. The open spaces between adjacent pads and between the crossbars of the single pads limits both traction and floatation of the loader. For example, when operating the skid steer in mud, the open spaces within the chain allow the mud to pass upwards. This causes the machine to sink, and creates extreme operating stresses for the drive motors. Indeed, skid steers using the current two-wheel tire chains in mud have to deal with a greater drive motor pressure than not having a chain at all, since the bare tires tend to spin in the mud, while the skid steers with current chains sink into mud. Traction is also lost due to the open spaces. When the chains move and push the mud, the mud simply moves over the crossbars of the pads. When the machine tries to move forward in the mud, the chains whip and mix the mud, instead of effectively pushing it backward and thus creating the thrust necessary to move the machine forward. The same result can be observed while working in sand, pebble and other like materials.

It has been recognized that the origin of problem with the large open spaces in current two-wheel tire chains is in the association with the single-wheel tire chains. The single-wheel tire chains rely on the tire itself to close the open spaces within the chain. The crossbars in the single-wheel tire chains provide only for the enhanced traction, while the tire provides for the floatation. In contrast, in the skid steer two-wheel tire chains in which the contact area between and chains and the operating ground is 5 to 10 times greater, there is currently no mechanism to deal with the floatation problem and, therefore, optimal traction cannot be reached as well.

G. Drawbacks of Current Tire Chains for Skid Steers

While tire chains have been used successfully with skid steer loaders, there are a number of drawbacks associated with such use. During operation of a skid steer with a set of tire chains, the contact surface of all pads wear down as the pads move on the operating ground. The pads eventually break or their limited traction capabilities diminish to an unusable level. The pads are the largest and most costly component of the tire chain. They are difficult and economically unsound to repair. The user has no other choice but to purchase a whole new set of chains, which often come at a considerable cost.

Another major drawback is the destructive nature of the current tire chains when used on concrete, asphalt and similar hard finished surfaces. As mentioned earlier, skid steers have become very popular machines on construction sites. This is especially true for small jobs sites in cities and residential areas where sidewalks, driveways, and asphalt are prevalent. Skid steer tire chains are heavy and difficult to handle, which makes dismantling or assembling a set of chains a time consuming venture that most users prefer to avoid. Damage to the operating ground occurs because the crossbars on each pad are constructed either of steel or cast iron. As the skid steer moves forward, the driving force delivered by the tire chain is usually greater than what the contacting surface can withstand. This causes the surface to scratch, crack or break. As a result, the current skid steer tire chains limit the operating grounds over which the machine may travel or operate, without such damaging drawbacks.

Accordingly, there is a need in the art for low ground pressure tire chains for skid steers to cope with the above-mentioned problems and inconveniences. It is to the provision of such that the present invention is directed.

SUMMARY OF THE PRESENT INVENTION

The present invention meets the need in the art by providing a tire chain for skid steers having spaced-apart pairs of wheels, in which the tire chain comprises a plurality of base units pivotally interconnected in series. Each base unit comprises a pair of opposing ears that each have a portion extending as an interior surface at an oblique angle towards the opposing ear, whereby during operative use of the base unit, a portion of a tire is momentarily wedged in a gap between the side supports. At least one transverse cross-member extends between the ears. The extending portion of the ears each defines a pair of opposing cavities between the extending portion, the ears, and respective laterally outwardly edges of the at least one cross-member. Each of the ears has a port, a cut-out section near the top portion of the ear. The transverse cross-members define a bore within the respective cavities for receiving a fastener. A plate attaches to a lower surface of the cross-members with the fasteners received through the bores. The links pivotally interconnect adjacent base units, for forming an endless-loop track for disposing around a pair of opposing wheels of a skid steer.

Objects, features, and advantages of the invention will become apparent upon reading of the detailed description in conjunction with the drawings, summary, and the claims hereto.

A BRIEF INTRODUCTION OF THE INVENTION

Figure 1A:
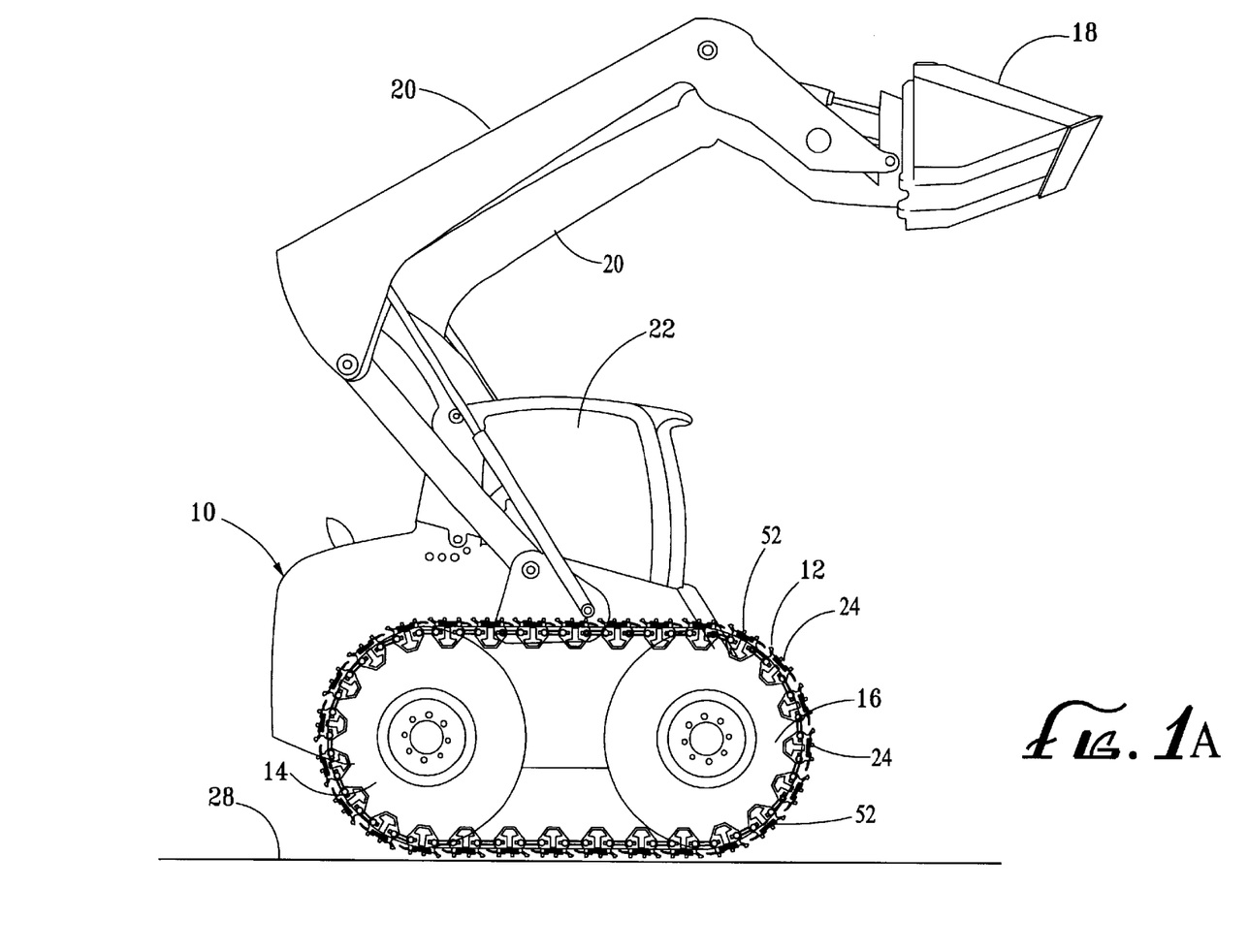
FIG. 1A is a side view of a skid steer with a chain made of base units with metal shoes, which embody principles of the present invention in a preferred form.
Figure 1B:
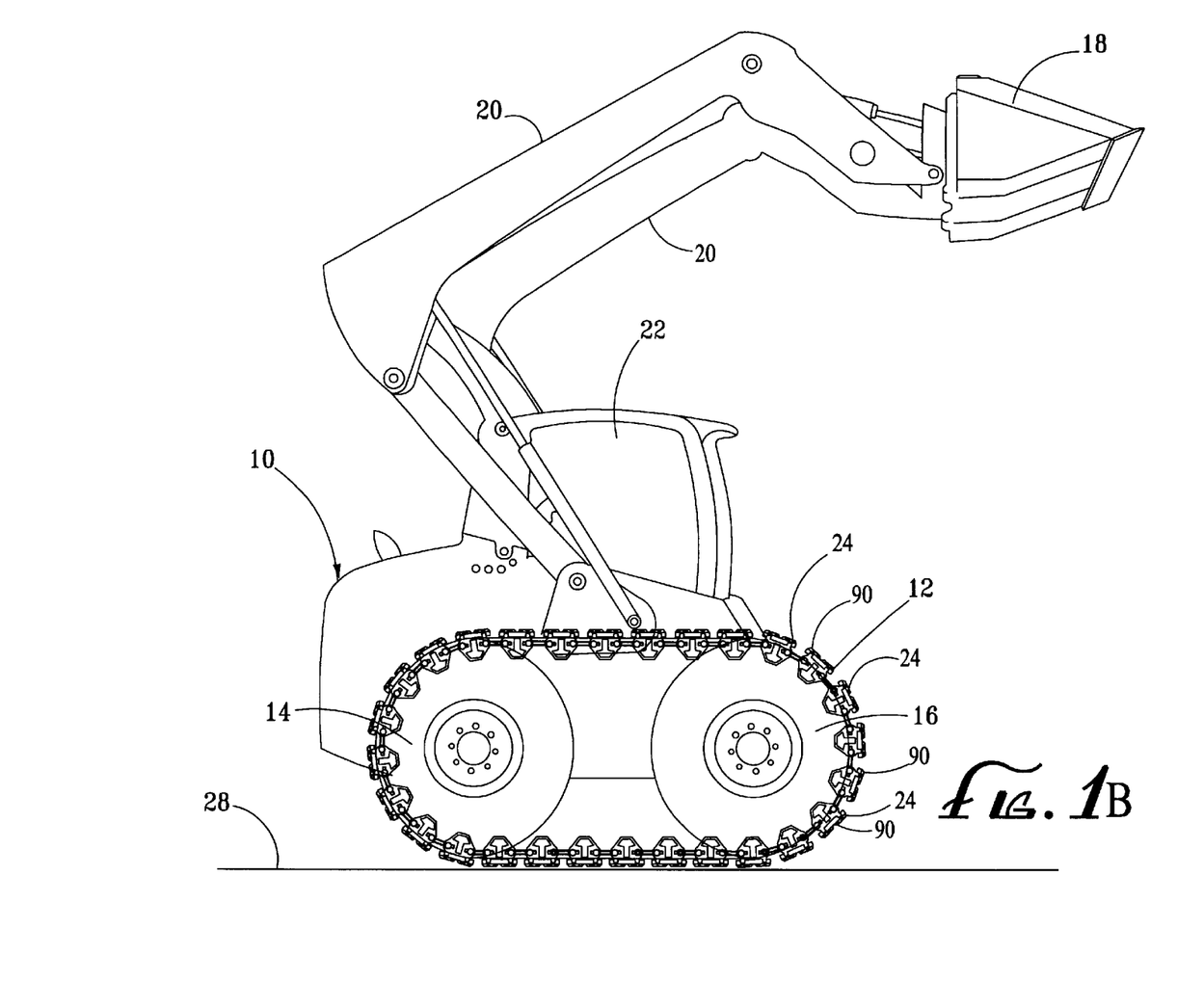
FIG. 1B is a side view of a skid steer with a chain made of bass units having rubber shoes according to the present invention.

With general reference to the drawings (described below), the present invention overcomes the limitations and restrictions of skid steer tires (14, 16) and current skid steer tire chains that occur both on slippery boggy surfaces and hard finished surfaces. As shown in FIG. 1, the track (12) and base units (24) comprising the track provide the skid steer 10 with an improved apparatus that resolves problems of floatation and traction, wear of the main chain components, and adverse effects on hard finished surfaces. In addition, the present invention stabilizes the maneuverability of skid steer loaders on slopes and enhances the overall control of the machine by the operator.

The track (12) of the present invention comprises multiple components assembled together to form tire chains (12), specifically designed for skid steers (10), but that can also be used on other construction vehicles with similar steering systems. There are five main components and these are called a base (30) (FIG. 2), a shoe (52) (FIG. 2) (and in an alternate embodiment, a rubber shoe (90)) (FIGS. 4, 4A, 4B and 4C), a link (26) (FIG. 3B) (pairs of links are used to pivotally connect adjacent bases to form the track) (FIG. 3A), and a pin (70) (FIG. 3C) to secure the links (26) to the bases (24).

The shoe (52) is a forged steel plate with three grousers (57, 67) which can be attached to the base member (30). The shoe (52) delivers low ground pressure and eliminates large open spaces on the track (12) increasing floatation and traction.

The rubber shoe (90) is a rubber plate with defined traction lugs or grousers (98). The skeleton of the rubber shoe (90) is composed of a forged steel core (92) that bolts on to the base member (30) and: a molded rubber exterior (94). The rubber shoe (90) eliminates open spaces and prevents the track (12) from damaging hard finished surfaces. The rubber shoe (90) provides traction, and allows the skid steer (10) to cross freely over hard surfaces such as concrete or asphalt.

The base member (30) is a cast piece with at least one cross bar (34) and adjacent connecting ears or side supports (32). The base member (30) allows the track (12) to be properly guided on the skid steer tires (14, 16) while connecting all other components together to form a continuous chain or track. The base member (30) is specifically designed to protect the skid steer tire (14, 16) from contacting the connecting parts the links (26), the pins (70), and the shoes (52, 90) during adverse driving ground conditions. In addition, the base member (30) allows the chain (12) to be easily rebuilt. The base member (30) has a 4-bolt pattern to which the shoe (52) or rubber shoe (90) attaches. The base member (30) also has adjustment holes (44, 46 or 45, 47) for connecting links (26) that allows the chain (12) to be tightened or loosened around the tires (14, 16) of the skid steer (10). The base unit (24) enables skid steers (10) using the chain (12) to selectively employ rubber shoes (90) or metal shoes (52) depending on the particular job application. The invention also allows for easy replacement of worn rubber shoes (90) or metal shoes (52) without the need to dispose of the rest of the chain (12), reducing the operational and maintenance costs.

The link (26) is a forged steel piece that connects subsequent base units (24) together forming the continuous chain (12). The link (26) allows the base units (24) to pivot at different angles while operating the skid steer (10) over uneven surfaces.

The pin (70) preferably is a forged steel carriage bolt with a hole (77) made in its ending tip where a cotter pin (79) is inserted. The pin (70) bolts through the base member (30) and the link (26) to attach them together. Although not a preferable solution, the pin (70) can also be made up of a nut and bolt.

BRIEF DESCRIPTION OF THE DRAWINGS

FIG. 4 is an exploded bottom view of the rubber shoe and base unit used in the chain illustrated in FIG. 1B.

FIG. 4A is a partially cut-away end view of the rubber shoe illustrated in FIG. 4 to show features of its construction FIG. 4B perspective detailed illustration of a portion of the rubber shoe illustrated in FIG. 4.

FIG. 4C is a top view of the rubber shoe illustrated in FIG. 4.

FIG. 4D is a side view illustrating the pivotal linked connecting adjacent pairs of the base units in the chain illustrated in FIG. 1B.

DETAILED DESCRIPTION OF THE PREFERRED EMBODIMENTS

With reference next to the drawings in which like parts have like identifiers, there is shown in FIG. 1A, a skid steer 10 with a plurality of base units (24) pivotally connected together to define a chain (12) embodying principles of the invention in a preferred form. The skid steer (10) includes a pair of opposing wheels (14, 16) on opposing sides of the skid steer. The wheels (14, 16) include conventional skid steer tires. The skid steer (10) includes a bucket (18) connected to distal ends of a pair of lifting arms (20) operable from a cab (22). Each base unit (24) pivotally connects to the adjacent base unit with a pair of opposing links (26). The chain (12) supports the skid steer 10 on the operating surface or ground (28). The chain (12) distributes the weight of the skid steer loader evenly, while providing an increased contact area of the skid steer with the operating surface or ground (28). The weight of the resulting chain (12) provides the skid steer (10) additional stabilization, which is especially beneficial when the machine is traveling uphill or downhill at an angle. The weight of chain (12) further reduces vibrations and shaking that often interfere with the performance of the skid steer (10). The embodiment illustrated in FIG. 1A shows the base unit (24) with a metal shoe (52). In contrast, the alternate embodiment of the tire chain (12) shown in FIG. 1B shows the base unit (24) with a rubber shoe (90).

Figure 2:
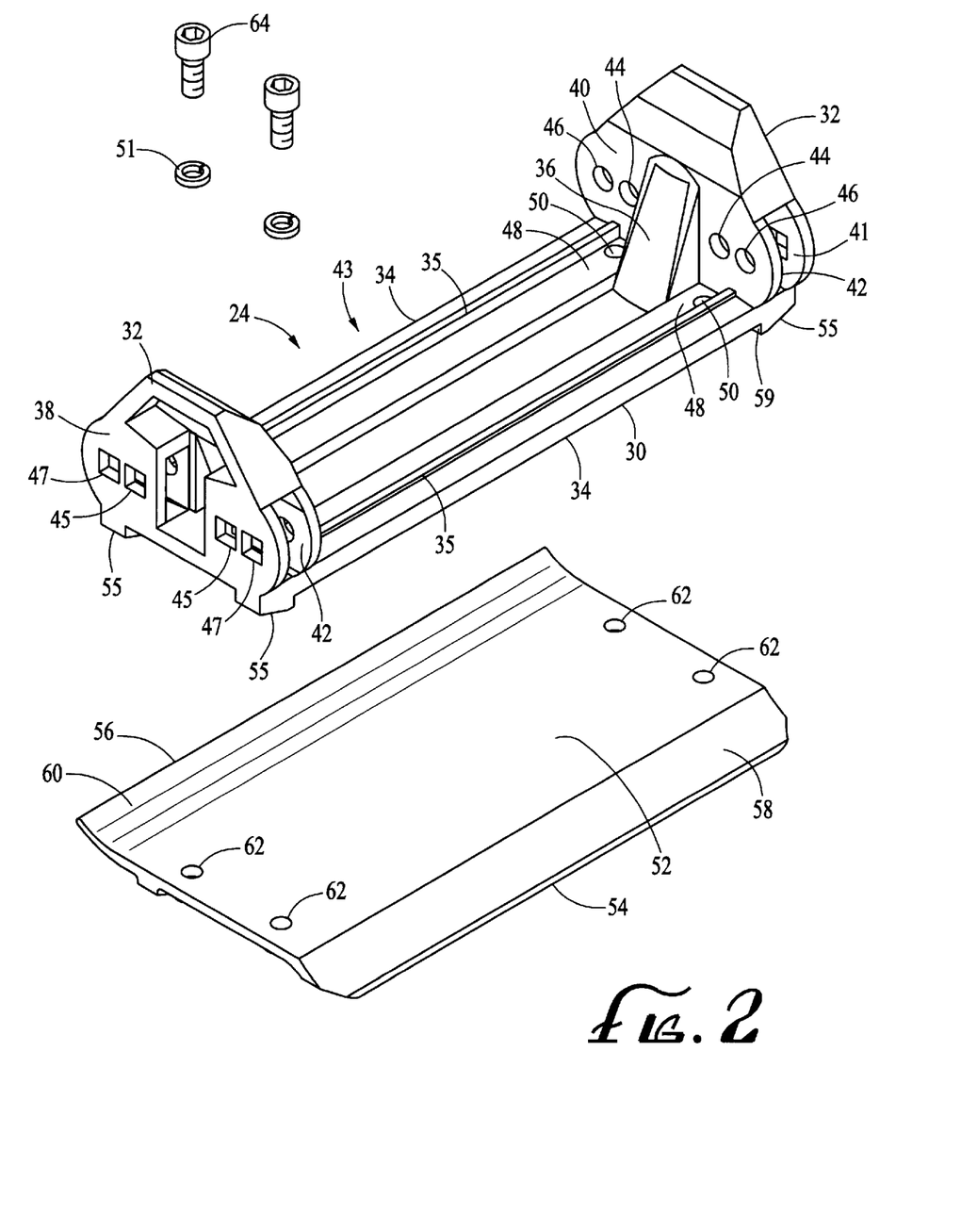
FIG. 2 is a perspective exploded view of a base unit and shoe for assembling the chain illustrated in FIG. 1A.

FIG. 2 is a perspective exploded view of a base unit (24) with a shoe (52) exploded therefrom. The base unit (24) is used with other base units in the chain (12) illustrated in FIG. 1A. The base unit (24) in FIG. 1B differs by having the rubber shoe (90), as discussed below. The base unit (24) is a cast one-piece member generally (30) having a pair of opposing upstanding ears (32). The ears (32) are interlinked by parallel opposing cross-members (34). Each of the ears has a port (120) substantially near the top of the ear to allow for the discharge of debris material. The spaced-apart ears (32) with the cross-members (34) define a recess generally (43) which receives a portion of the tires (14, 16) during operation of the track (12) on the skid steer (10). The at least one cross-member (34) has a protruding cross-member lip (35). Where there is more than one cross member (34), they are spaced apart. The lip (35) engages the tread of the tires (14, 16) during operation of the skid steer (10) with the track (12). A wedge (36) extends from an inner face (40) of the ear (32) and tapers at an oblique angle towards the opposing ear. The wider portion of the wedges (36) are towards the cross-members (34). Each ear (32) has an outer face (38) and the inner face (40). These faces (38, 40) are spaced-apart to define a gap (41). therebetween. Opposing sides of the ears 32 define elongated slots (42) for receiving links (26) into the gap (41) between the faces (38, 40), as described below. Two pairs of circular openings (44, 46) are defined on the inner face (40) of the ears (32) on opposing sides of the wedge (36). Two pairs of rectangular-shaped openings (45, 47) are defined on the outer face (38) of the ears (32) on opposing sides of the wedge (36) in alignment with circular holes (44, 46) on the inner faces (40), for a purpose discussed below. In an alternative embodiment, these holes can be configured with the rectangular-shaped openings (45, 47) on the inside and circular holes (44, 46) on the outer faces (38)

The wedges (36) define opposing recess portions or cavities (48) between the respective wedge (36), the inner face (40) of the respective ear (32), and a laterally outward edge of the respective cross-member (34). The at least one cross-member (34) defines a bore (50) within each recess (48) of the base (30).

A shoe guide (55) depends from each of the ears (32). The shoe guides (55) in the illustrated embodiment are generally rectangular shaped projections with an outer sloping edge. An inward backside (59) opposing the sloping edge is flat and perpendicular to the cross-member (34). The shoe guides (55) are transverse to the cross-member (34).

FIG. 2 illustrates a shoe (52) exploded from the base (24). The shoe (52) is a metal plate that includes a leading edge (56) and a trailing edge (54). The trailing portion (58) of the shoe (52) is generally curved in a first direction while the leading portion (60) of the shoe (52) is generally curved in a second opposite direction. Preferably, the trailing edge (54) extends in a direction towards the surface or ground (28) on which the skid steer (10) is being operated during forward operation of the skid steer. A grouser (57) (illustrated in FIG. 3) depends from the trailing edge (54) for engaging the ground (28) during operations of the skid steer. Threaded bores (62) of the shoe (52) align with the openings (50) of the base (30). The lateral outer edges of the shoe (52) align between the shoe guides (55) before the shoe is fastened into position to the lower portion of the base member (30). In the illustrated embodiment, allen-type fasteners (64) (two of which are illustrated) extend through lock washers (51) and the openings (50) to engage the threaded bores (62) in the shoe (52). The allen-type fasteners (64) are disposed within the respective cavity (48) for rigidly connecting the shoe (52) to the base member (30).

Figures 3, 3A, 3B, 3C:
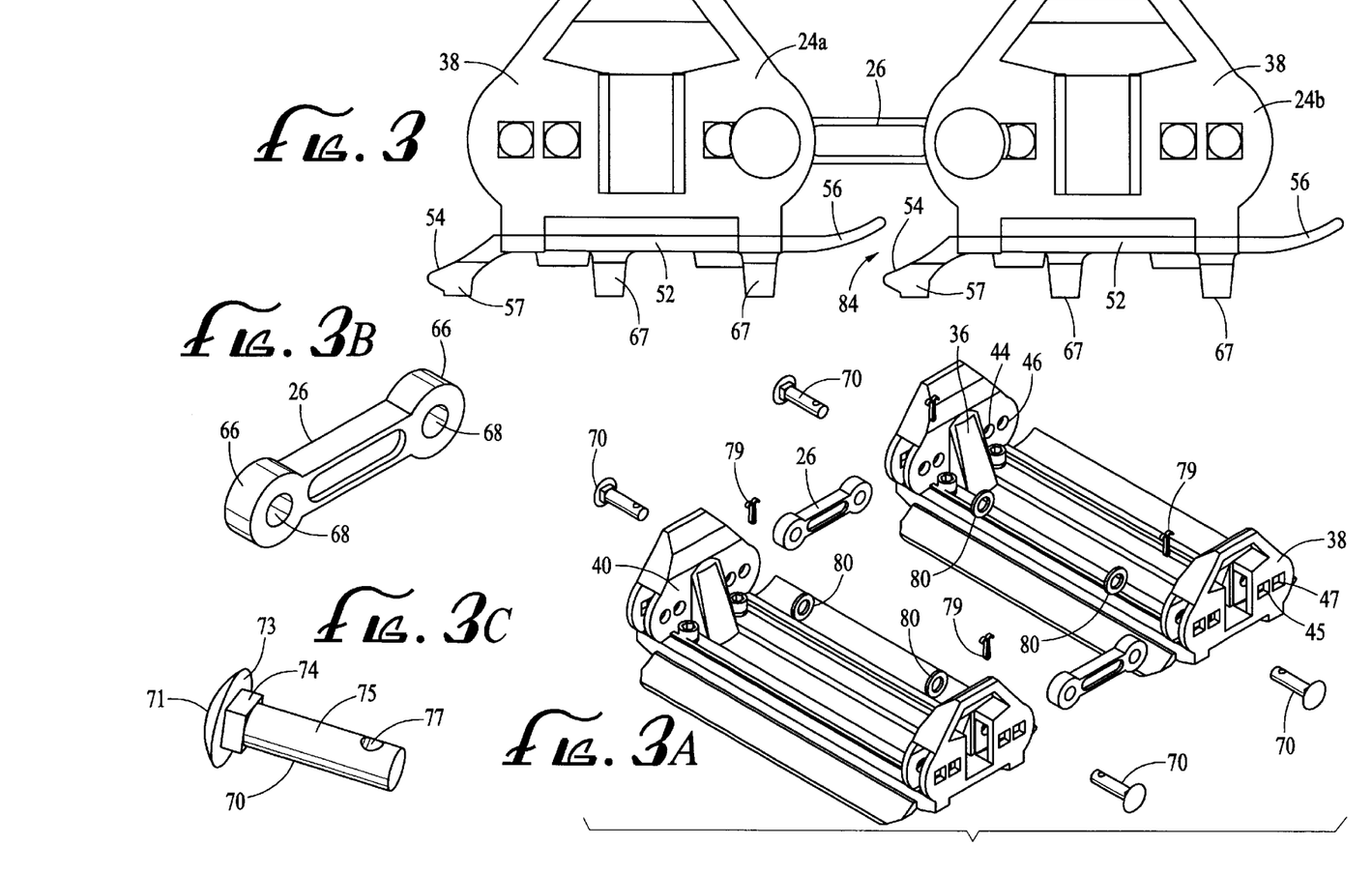
FIG. 3 is a side view of a pair of the base units illustrating the pivotal linked connection between adjacent pairs of the base units in the chain illustrated in FIG. 1A.
FIG. 3A is a exploded perspective view of the pair of base units illustrated in FIG. 3.
FIG. 3B is a perspective view of a link for interconnecting adjacent pairs of the base units as illustrated in FIGS. 3 and 3A.
FIG. 3C is a perspective view of a pin for engaging the link and e base unit illustrated in FIG. 3B and FIGS. 3 and 3A.

FIG. 3 is a side view of a pair of the base units (24), and FIG. 3A is an exploded perspective view of the pair of base units. In the illustrated embodiment, a pair of spaced-apart projecting grousers (67) extend from a bottom surface of the shoe (52). Adjacent base units (24a and 24b) in the chain (12) pivotally connect with a pair of the links (26) that are received in the slots (42). As best illustrated in FIG. 3B, the link (26) is an elongated member having enlarged opposing distal ends (66) that each defines an opening (68). The distal ends (66) are received through the slots (42) of the adjacent base units (24). The openings (68) align with a selected one of the rectangular and circular openings (44, 45; or 46, 47, selectively) in the inner and outer faces (40, 38). A pin (70) passes through the openings (44, 45; or 46, 47) and the opening (68) to secure the link (26) to the base unit (24).

As best illustrated in FIG. 3C, the pins (70) preferably are carriage bolt-type fasteners, having a semispherical head (71) and flat face (73) on the opposing side of the head. A rectangular flange (74) extends therefrom. The flange (74) aligns with the rectangular openings (45, 47) of the ears (32) in the base member (30). A round shaft (75) extends from the rectangular flange (74) of the pin (70) for aligning with the openings (44, 46) on the inner face (40) at the ear (32). The pins (70) pass through the openings (44, 45; or 46, 47) and the openings (68) to secure the link (26) to the base unit (24). A round flat washer (80) is received over the shaft (75). The illustrated pin (70) defines a hole (77) in a distal end portion. The hole (77) receives a cotter pin (79) (see FIG. 3A) for securing the pin (70) in position.

As illustrated in FIG. 3, the trailing edge (54) of one shoe (52) overlaps the leading edge (56) of the shoe (52) in the adjacent base unit. This defines an overlap gap (84) between the adjacent shoes (52) of the base units (24).

Figure 5:
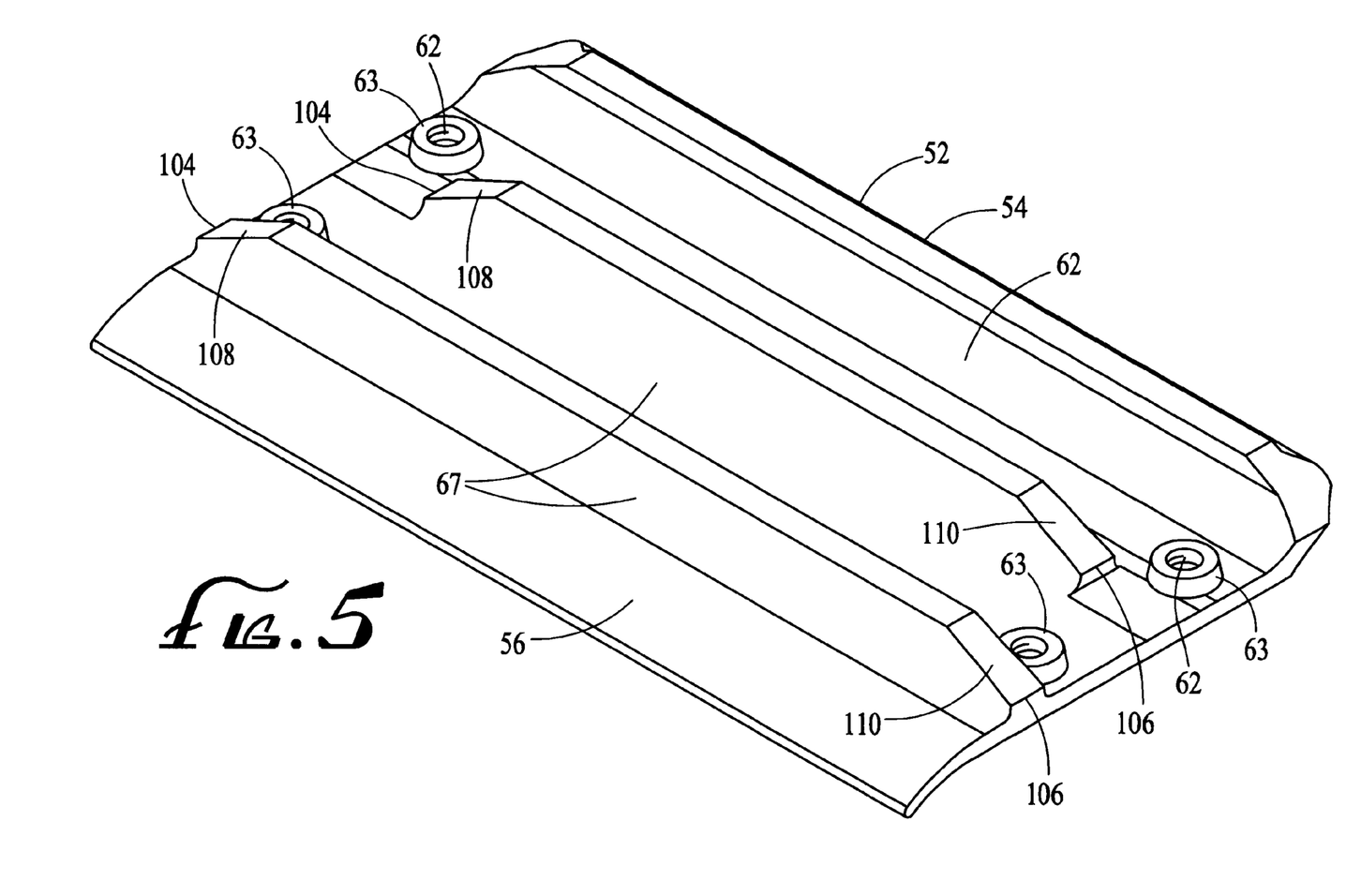
FIG. 5 is a perspective view of an exterior face of an embodiment of the shoe according to the present invention.

FIG. 5 is a bottom-up view of the shoe (52) illustrating features of the projecting grousers (67) in one embodiment. In this embodiment, the grousers (67) have opposing distal ends (104, 106) that define tapering surfaces (108, 110). These tapering surfaces (108, 110) facilitate rotation and turning of the skid steer (10). In the illustrated embodiment, the bores (62) extend through projections (63) on the bottom surface of the shoe (52).

Figures 4, 4A, 4B, 4C, 4D:
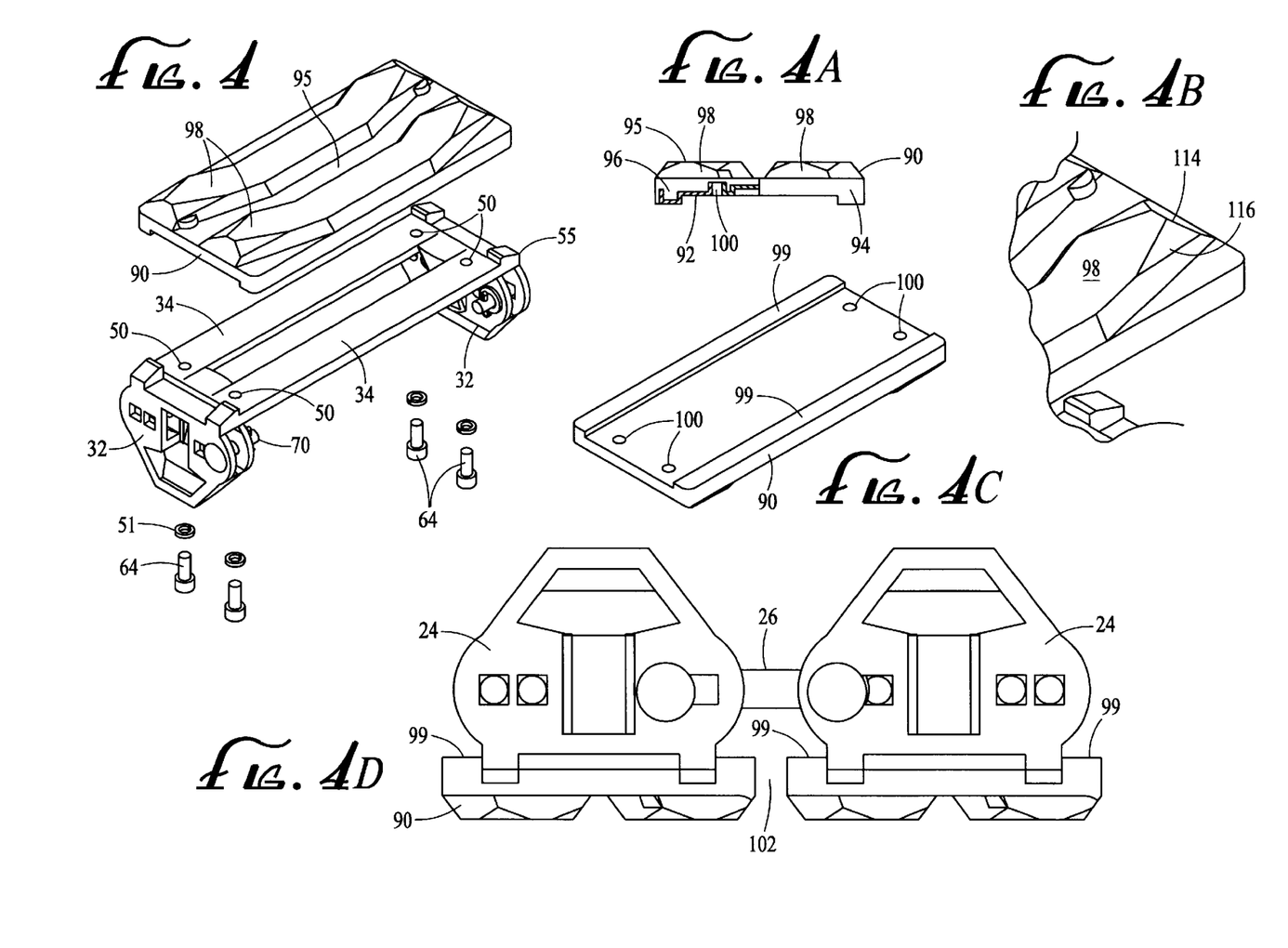
Figure 7:
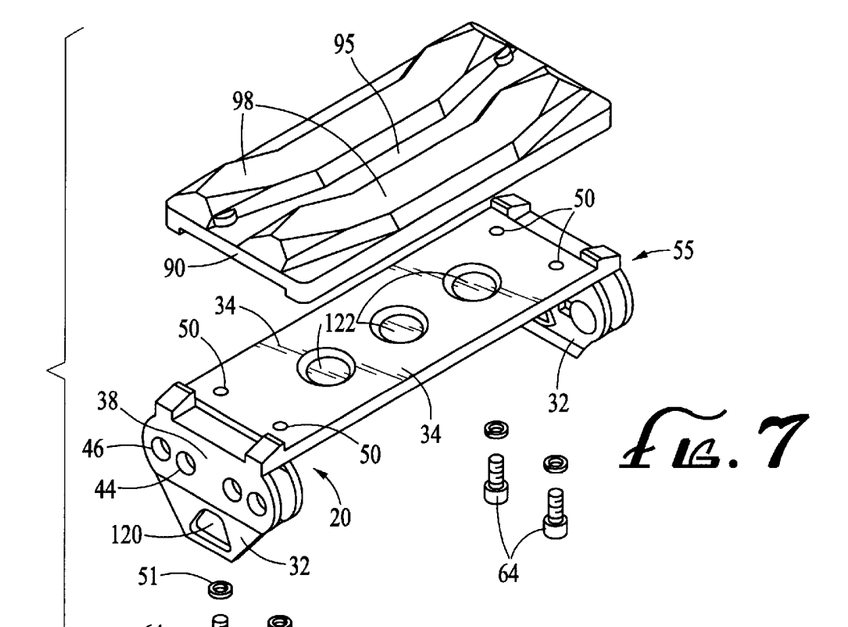
FIG. 7 is an exploded bottom view of the rubber shoe and another embodiment of the base unit used in the chain illustrated in FIG. 1B.

FIG. 4 and FIG. 7 are an exploded view of the base unit (24) illustrated in FIG. 1B equipped with a rubber shoe (90). As shown in partial cross-sectional view in FIG. 4A, the rubber shoe (90) includes a steel core (92), which is sandwiched with molded rubber (94). The rubber (94) defines an exterior wear surface (95) from which grousers (98) project. As shown in the partially cut away view, the rubber (94) is molded to the steel core (92). FIG. 7 shows ports (120) for discharging debris and optional circular cutout regions (122) on the under side of the base unit (34) to lighten the weight the base unit without decreasing metal strength.

As shown in detail perspective view in FIG. 4B, the distal ends (114) and ending corners (116) of the grousers (90) are tapered to facilitate rotation and turning of the skid steer (10). FIG. 4B also shows a plurality of spaced-apart steel core cups (96) secure the molded rubber (94) to the steel core (92).

FIG. 4C illustrates a bottom view of the rubber shoe (90). The rubber shoe (90) has locking ridges (99) which align with the cross-members (34) in the base member (30). The steel core (92) defines threaded openings (100) that align with the bores (50) of the base unit (24). As shown in FIG. 4, the rubber shoe (90) is secured to the base unit with allen-type fasteners (64).

Figure 8:
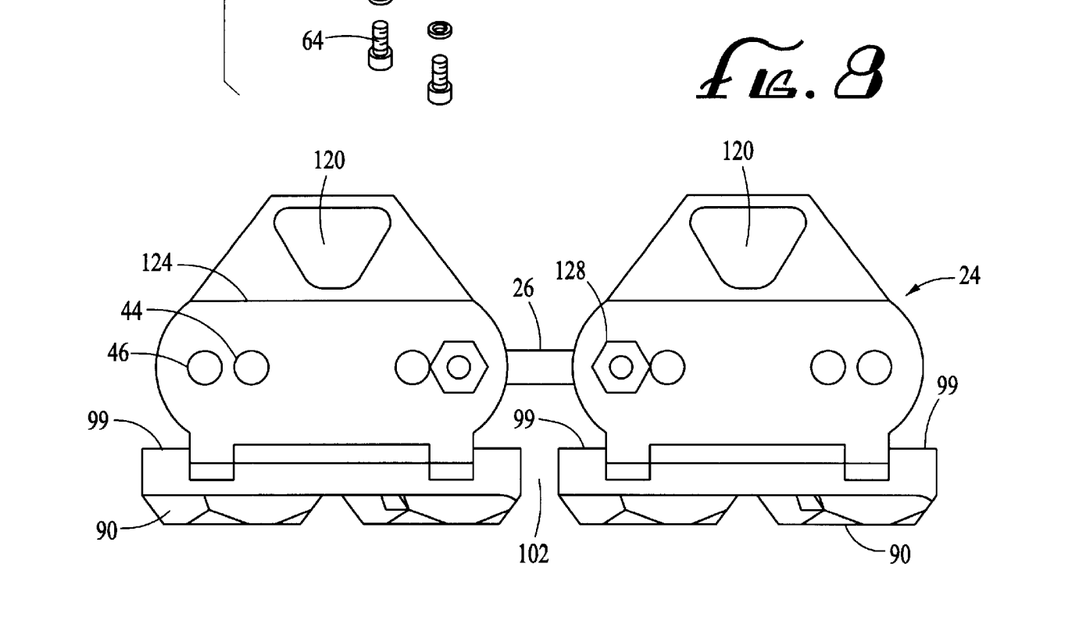
FIG. 8 is a side view illustrating the pivotal linked connection between adjacent pairs of a further embodiment of base units in the chain illustrated in FIG. 1B.

FIG. 4D and FIG. 8 illustrate a side view of a pair of base units (24) with attached rubber shoes (90). The adjacent base units (24) are joined together with a pair of opposing links (26). The leading edge of the trailing base unit (24) and the trailing edge of the adjacent base unit define a gap (102). The gap (102) allows the base units (24) to bend at different angles on the chain (12) while the skid steer (10) is moving over the ground (28). The gap (102) also allows for chain (12) adjustments. FIG. 8 depicts an alternative embodiment of the invention with ports (120) to allow for discharge of debris. Also shown in this alternative embodiment are bolts (128) for securing a threaded pin (70), whereby the threaded portion of pin (70) extends through the circular openings (44, 46) on outer face (38). A lock washer, such as (51), is fitted over pin (70) to secure bolts (128).

Figure 6:
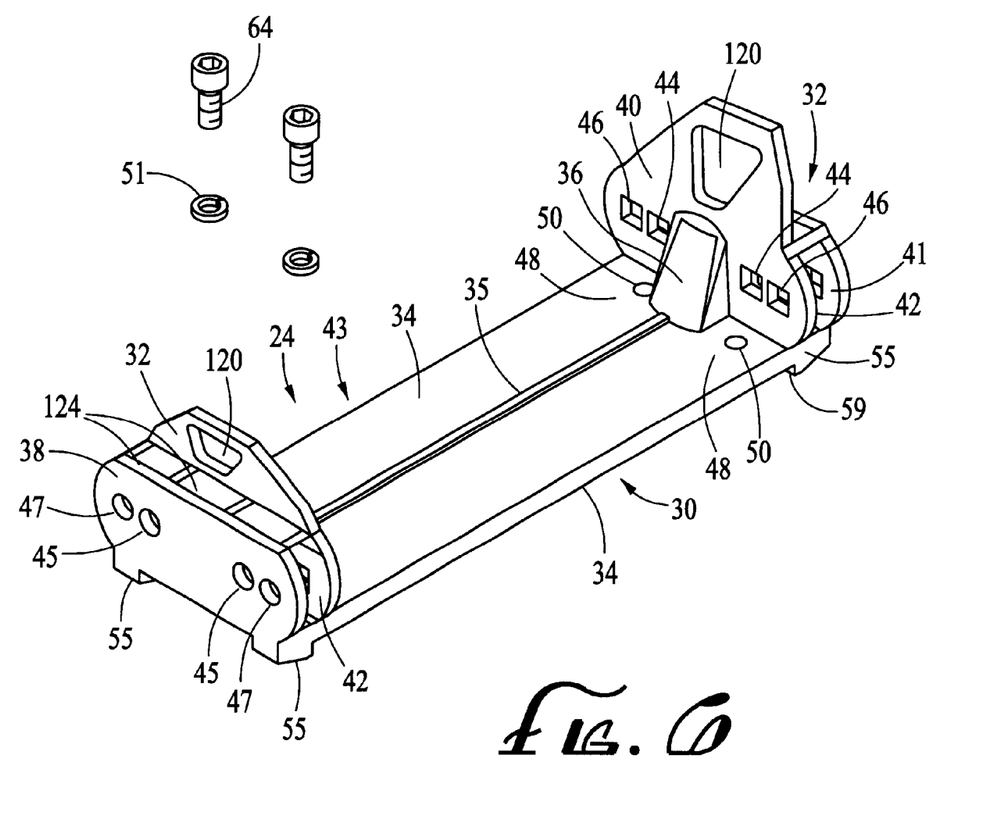
FIG. 6 is a perspective exploded view of another embodiment of a base unit for assembling the chain illustrated in FIG. 1A

FIG. 6 illustrates a base unit (24) in an alternative embodiment with only one cross member. Also depicted are ports (120) for discharge of debris from the base unit. FIG. 6 also depicts top openings (124) in the link chamber formed by the outer wall (38) and the ear (32). This top opening (124) is designed to allow for the discharge of debris that may enter around the links (26) when received in slots (42).

With reference to FIGS. 1A, 2, and 3, the chain (12) is used with the skid steer (10) having opposing pairs of wheels (14, 16) for moving the loader at a construction site. The base units (24) are assembled by first connecting the shoe (52) or rubber shoe (90) to the base member (30). This is accomplished by aligning the shoe (52) or the rubber shoe (90) with the bottom of the base member (30) against the shoe guides (55). Then the allen-type fasteners (64) extend through lock washers (51), the aligned holes (50) in the cross-members (34) of the base member (30), and engage the threaded holes (62) in the shoe (52) or threaded holes (100) in the rubber shoe (90). The heads of the allen-type fasteners (64) are received in the recesses (48). These types of fasteners are preferable over nuts that wear on the outside surfaces due to sand, dirt, pebbles, that round the edges which make the nuts difficult to remove for repair or replacement of the track and the shoes. Moreover, the holes (50) are located on opposite ends of the cross-member (34) strengthening the support of the allen-type fasteners (64) to the shoe (52) or rubber shoe (90). The threaded holes (62) and (100) eliminate the need for fasteners on the wear surface of either the shoe (52) or rubber shoe (90). It is to be appreciated that the allen-type fastener (64) has an enclosed tool bed, which sustains exterior wear, yet and allows the allen-type fastener (64) to be easily removed if necessary. The compact size of the allen-type fastener (64) allows it to fit within the recess (48) and thereby avoid contact with the tire (14, 16), during operation of the skid steer (10) with the chain (12).

With reference to FIGS. 1A, 3 and 4D, the base units (24) are then assembled into the chain (12). This is accomplished by connecting adjacent base units (24) with the opposing pairs of links. (26). One of the links (26) inserts through one of the slots (42) in the ear (32) of one of the base units (24). The link (26) is fastened thereto by passing the pin (70) into the hole (44, 45; or 46, 47, selectively), depending on the spacing desired between adjacent base units (24). The rectangular flange (74) of the pin (70) conforms to the square-shape of the holes (45, 47) and prevents the pin (70) from turning.

With the pin (70) locked in position, two sides of the pin (70) will receive most of the wear during operation. After sustaining substantial wear from operation of the chain (12), the pin (70) can be repositioned 90 degrees from its original position within the holes (45, 47) for additional usage. The shaft of the pin (70) passes through the opening (68) in the link (26) and a flat washer (80) touching against the inner face (40) of the ear (32). The pin (70) can be threaded to receive a bolt (128) or have a hole (77) to receive a cotter pin (79). The cotter pin (79) extends through the hole (77). The free ends of the cotter pin (79) fold back to secure the pin (70) to the link (26) and to the base unit (24). The cotter pin (79) prevents the pin (70) from dislodging. Moreover, the cotter pin (79) is preferred because it is able to sustain heavy vibration unlike threaded nuts that might otherwise be shaken off or worn down during operation of the skid steer (10). The distal end of the pin (70), flat washer (80), and the folded cotter pin (79) lie within the recess (48). The pin (70) is positioned flat against the outer wall (38) with its concave head (71) facing outwardly away from the base (24). In this position, the head (71) of the pin (70) will accept wear or blows from contacting the ground (28) during operation. This position prevents the pin (70) fastener from becoming damaged or dislodged when making contact with the ground (28). The cavity (48) provides a sheltered location where all connection points lie. The recess (48) allows all connecting parts (70, 80, 79, 64, and 51) to act freely from contact or wear by the tires (14, 16), thereby preventing wear on both the adjoining parts and the tires.

The chain (12) is then wrapped over the spaced-apart tires (14, 16) of the skid steer (10), and the opposing distal ends of the chain (12) secured with the links (26) as discussed above. Portions of the tires (14, 16) become wedged in the recess (43) defined by the opposing ears (32) and the wedge-shaped extending surfaces (36) during operation of the track (12). During usage, the interior expulsion ports (120) allow debris materials to be expelled during usage instead of building up and fouling the chain. With reference to FIGS. 1, 2, and 3, the tires are resilient, and so are engagingly contacted by the cross-member lip (35), which prevent the tires from slipping over the at least one cross-member (34) and into the cavity (48) between the opposing extending surfaces (36).

During operation of the skid steer (10), the chain (12) rotates in response to rotation of the drive wheels (14, 16). The tires engage and release from the recesses (43) in the base units (24) in sequence as the chain (12) moves. This facilitates the tires retaining the chain (12) in line. Further, the extending surfaces (36) restrict the tires from entering the recesses (48), and thereby keeping the tires away from the fasteners (64), lock washers (51), pin (70), flat washers (80), and cotter pin (79).

The trailing edge (54) of the shoe (52), together with the grousers (57, 67), dig into the ground as the tires (14, 16) rotate, thereby providing traction for moving the skid steer (10) across the ground (28). The tapered distal ends (104, 106) of the shoe (52) facilitate the rotation and turning of the skid steer (10) by allowing the shoes (52) to slide freely in parallel direction to the grousers (67) when turning. The tapered surfaces (108 and 110) prevent the shoe (52) from sticking to the ground (28) when sliding side-ways during a turn of the skid steer (10). The trailing edge (54) of the shoe (52) on the leading base unit (24) overlaps the leading edge (56) of the shoe (52) of the following adjacent base unit (24) on the chain (12). The gap (84) is narrow and close, and allows the chain (12) to rotate around the diameter of the wheels (14, 16), as illustrated in FIG. 1A. The overlapping leading and trailing portions of the shoes (52) lock together and the gap (84) closes by upward pressure of the ground materials and restricts significant amounts of mud, sand, and the like from passing between the chain (12).

Further, the shoe (52), secured by the four fasteners (64) distributes the loading across the base member (30) and the cross-members (34). The overlapping shoes (52) restrict the passage of mud, sand, and the like into the chain 12 and the space between opposing tires (14, 16). The substantially closed chain (12) accordingly provides floatation for the skid steer (10) as it travels, turns, and scoops in mud, sand, and other soft ground, to provide improved traction while reducing the tendency of the skid steer compact loader to sink during operations.

The grousers (57, 67), the trailing edge (54), and the bottom surface of the shoe (52), define wear surfaces for the chain (12). The shoe (52) is readily replaceable. The fasteners (64) are removed from the worn or broken shoes (52) and the shoes are readily and easily replaced.

In the alternate embodiment illustrated in FIG. 4, the rubber shoe (90) provides a resilient surface for operating the loader (10) on finished surfaces such as roadways, sidewalks, and the like, without damage. The rubber shoe (90) is readily installed, as discussed above, with the fasteners (64). The rubber grousers (98) dig into the ground as the wheels rotate, thereby providing traction for moving the skid steer (10) across the ground (28). The tapered distal ends and corners (114, 116) facilitate rotation and turning of the skid steer (10) by allowing the rubber shoe to slide freely in parallel direction to the grousers (98) when turning. The tapered surfaces (114 and 116) prevent the shoe (90) from sticking to the ground (28) when sliding side-ways during a turn of the skid steer (10). The narrow gap (102) between rubber shoes (90) restrict the passage of mud, sand, and the like into the chain (12) and the space between opposing tires (14, 16). The substantially closed space chain (12) provides floatation for the skid steer (10) as it travels, turns, and scoops in mud, sand, and other soft ground, to provide improved traction while reducing the tendency of such compact loaders to sink during operations. The interior expulsion ports (120) in ears (32) provides for the discharge of whatever debris material that may become caught in the wheel side portion of the chain (12). These ports (120) are an improvement over the prior art because they enables the debris material to be discharged, thereby preventing the debris material from building up on the tire side of chain (12) and causing the chain (12) to break.

With reference to FIG. 2, the shoe guides (55) allow either the rubber shoe (90) or shoes (52) to be positioned properly before being fastened to the base member (30). In addition, shoe guides (55) reinforce and secure the shoe (52) or rubber shoe (90) during operation of the skid steer (10). The locking ridges (99) of the rubber shoe (50) facilitate aligning the rubber shoe with the cross-members (34).

The present invention of a base unit (24) and chain (12) overcomes the limitations and drawbacks found in skid steer loaders and tire chains with improved performance and use of tire chains (12). First, the large open space between the tires (14, 16) no longer fills with debris, which if permitted to seep or rise up can cause the machine to sink quickly. This enables the skid steer to have lower ground pressure with increased floatation. Second, traction is increased because the added floatation allows the skid steer to operate above the boggy surface. Thus, the tire chain (12) provides the skid steer with better and more effective contact with the operating surface or ground. Third, the rubber shoe enables the skid steers to travel freely over hard finished surfaces without causing damage. Fourth, the 4-bolt attachment system allows users to choose selectively between shoe (52) and rubber shoe (90), depending on the particular requirements and limitations of the work to be accomplished. Fifth, worn shoes (52), rubber shoes (90), or damaged parts, can be replaced easily eliminating the need to purchase an entirely new set of tire chains. The base (24), which is the most complicated and expensive component of the chain (12), makes virtually no contact with the operating ground and is thus protected from wear. Sixth, the tapered distal ends and corners of both shoe (52) and rubber shoes (90) facilitate rotation and turning of the skid steer (10). Seventh, the weight of the base units (24) provides the skid steer 10 with additional and improved operational stabilization. Eighth, the feature of interior expulsion ports (120) in ears (32) allow for the ready discharge of debris material caught on the wheel side of tire chain (12). This enables the tire chain (12) to be cleared more readily from debris materials, such as mud, gravel and dirt that build up on the inside portion of the tire chain (12). Ninth, the feature of optional circular cutout regions (122) to lighten the weight of the metal without diminishing the strength of the metal. Tenth, the link chamber top openings (124) to allow debris material to discharge when caught in the chamber where links are received.

The base units (24) and the chain (12) assembled with a plurality of such units meets the need in the art by overcoming the limitations and drawbacks associated with the current tires and tire chains for skid steers. While the present invention has been described in detail with particular references to the preferred embodiments thereof, it should be understood that many modifications, additions and deletions, in addition to those expressly recited, may be made thereto without departure from the spirit and scope of the invention as set forth in the claims.

I claim the following:

1. A base unit in a circular track that is placed about wheels of a parallel wheeled vehicle for increasing traction of the vehicle comprising:

two side members, each having a top edge and a bottom edge;

at least one cross-member spanning between said side members near said bottom edges of said side members;

at least one of said side members having a port substantially near said top edge; and, said at least one cross-member capable of receiving a detachable base pad whereby said port is capable of expelling any dirt that may accumulate between said wheels and said track to reduce the likelihood of the accumulation of excess pressure between said track that may cause breakage of said track.

2. A circular track that is placed about wheels of a parallel wheeled vehicle for increasing traction of the vehicle, said circular track having multiple base units, at least one of said base units comprising:

a first side support and a second side support, each having a bottom edge;

at least one of said side supports having a port substantially near a top edge;

at least one cross member having a first end, a second end and two lateral edges, said first and second ends of said cross member connected to said first and second side supports, respectively, near said bottom edges of said side supports; and, a base pad capable of being detachably secured to said cross member such that said base pad extends beyond at least one of said lateral edges of said cross member whereby said base pad can serve to block dirt from passing between adjacent base units of said circular track.

3. The base unit of claim 1 further comprising:

said at least one cross member having a first end, a second end and two lateral edges, and a base pad capable of being detachably secured to said cross member such that said base pad extends beyond at least one of said lateral edges of said cross member whereby said base pad can serve to block debris from passing between adjacent base units of said circular track.

4. The base unit of claim 1 where in said at least one cross member has a bottom area; and, a base pad having a bottom surface area that is larger than said bottom area of said cross member, said base pad capable of being detachably secured to said cross member whereby said base pad can serve to block debris from passing between adjacent links of said circular track.

5. The base unit of claim 1 wherein said base pad is secured by four allen-type screws, said allen-type screws received by receptacles located in cavities at opposite ends of said cross member near said side members, said cavities protecting said allen-type screws from wear by said wheel and debris.

6. A base unit for assembly with a plurality of pivotally interconnected ones of said base unit to form an endless track for small loaders, comprising:

a pair of opposing side supports, each having a portion extending as an interior surface at an oblique angle towards the opposing side support, whereby during operative use of the base unit a portion of a tire is momentarily wedgingly received in a gap between the opposing side supports at least one transverse cross member attached at opposing ends to the side supports;

the extending portion of the side supports each defining a pair of opposing cavities between the extending portion, the side support, and respective laterally outwardly edges of the cross-members, and the transverse cross members defining an bore within the respective cavities for receiving a fastener therethough;

at least one of said side supports having a port substantially near said top edge whereby said port is capable of expelling any debris that may accumulate between said wheels and said track to reduce the likelihood of the accumulation of excess pressure between said track that may cause breakage of said track;

a plate attached with fasteners to a lower surface of the cross members with the fasteners received in the bores.

7. The base unit as recited in claim 6, wherein the cross member has a protruding lip to engage with the tread of tires during operation.

8. The base unit as recited in claim 6, wherein the bores are substantially entirely within a space between the side supports and a line parallel to a longitudinal axis of the base unit at the extent of the extending portion of the side support at a junction thereof with the cross members.

9. The base unit as recited in claim 6, wherein the opposing side supports each comprise:

a pair of spaced-apart flanges that define a gap therebetween for receiving a member to connect one base unit to an adjacent base unit;

the flanges defining aligned openings for receiving a fastener therethrough to connect the member to the side support; and at least one top opening designed to allow for the discharge of debris from the gap between the space-apart flanges.

10. The base unit as recited in claim 6, wherein the plate defines threaded openings for engaging a threaded fastener that passes through the bores to the plate.

11. The base unit as recited in claim 6, wherein the fastener comprises a carriage bolt having a concave head disposed inwardly of the inward flange and a fastener engaged on an exterior side of the flange, the bolt passing through the opening in the member, whereby the member is pivotally connected to the track.

12. The base unit as recited in claim 6, wherein the fastener comprises a bolt and a hex nut having a concave head disposed inwardly of the inward flange and a fastener engaged on an exterior side of the flange, the bolt passing through the opening in the member, whereby the member is pivotally connected to the track.

13. The base unit as recited in claim 6, wherein the plate comprises a composite assembly of a rigid metal plate sandwiched by a resilient jacket having projecting teeth from a lower surface.

14. A track for small loaders having spaced-apart pairs of wheels, comprising a plurality of the base units as recited in claim 6 with adjacent base units pivotally interconnected in series by a pair of links.

15. A track for small loaders having spaced-apart pairs of wheels, comprising a plurality of the base units as recited in claim 13 with adjacent base units pivotally interconnected in series by a pair of links.

16. The track as recited in claim 15, wherein the base plates are closely spaced whereby said base pad can serve to block debris from passing between adjacent links of said circular track.

* * * * *